Feb. 7, 1967 A. G. ROSA 3,302,279
METHOD OF MAKING BALLPOINT-PEN TIPS
Filed Sept. 21, 1965
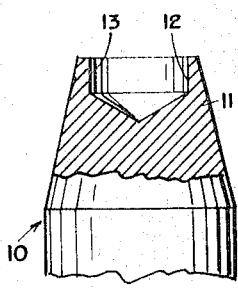
FIG.1
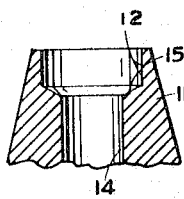
FIG.2
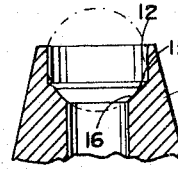
FIG.3
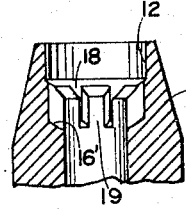
FIG.4
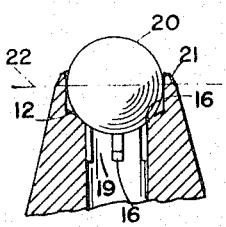
FIG.5
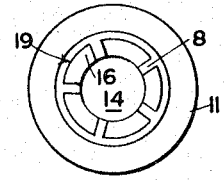
FIG.6
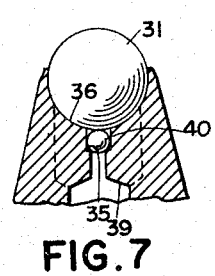
FIG.7
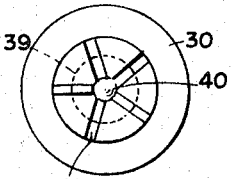
FIG.8
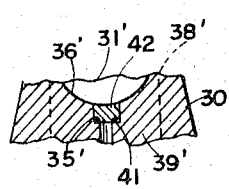
FIG.9
FIG.10
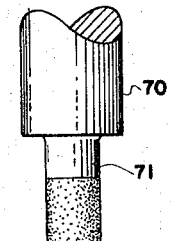
FIG.13
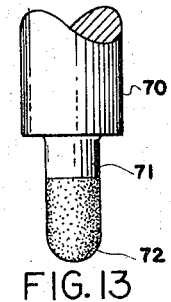
FIG.11
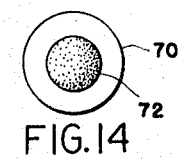
FIG.14
FIG.12
INVENTOR:
Anthony G. Rosa
BY
Karl G. Ross
Attorney

United States Patent Office 3,302,279
Patented Feb. 7, 1967

3,302,279
METHOD OF MAKING BALLPOINT-PEN TIPS
Anthony G. Rosa, 155 Park Ave., Lyndhurst, N.J. 07071
Filed Sept. 21, 1965, Ser. No. 488,860
3 Claims. (Cl. 29—441)

This application is a continuation-in-part of my copending application Ser. No. 208,211 filed July 9, 1962, now Patent No. 3,242,906, granted March 29, 1966.

My present invention relates to ballpoint pens and, more particularly, to an improved method of making ballpoint-pen tips.

It has been known, heretofore, to provide a socket adapted to receive a ball forming therewith a ballpoint-pen tip, with axially extending channels opening at the surface of the ball and communicating with the ink-supply bore for increasing the amount of ink fed to the ball. Generally, the socket was formed with an annular seat for the ball in substantially line contact therewith. High axial pressure was then applied to the ball in order to deform the seat and shape it to conform to a spherical sector hugging the ball. Thus, the socket was provided with the channels, and the balls then seated in the recess under the aforementioned pressure so that the channels were often pinched shut and could only permit the passage of limited quantities of ink, thus defeating the purpose of the channels. Moreover, when the ball was composed of sapphire as is common in the trade, the substantial axial pressure often damaged the balls in assembly, leading to large numbers of rejects, or produced latent defects which reduced the life of the point. It is an object of my invention, therefore, to provide a method of making ballpoint-pen tips whereby a continuous and plentiful supply of ink to the writing surface of the ball is insured.

It is another object of this invention to provide a method of making a pen point of the character described which is less susceptible to wear than hitherto known tips while affording a uniform and plentiful supply of ink to the writing ball, while reducing the number of defects in assembly as well as the number of tips evidencing latent defects, especially when sapphire balls are employed.

Still another object of my invention is to provide an improved tool for obviating the aforementioned disadvantages.

These objects have been realized, according to the invention as described in the aforementioned copending application, by a method of forming the tip of the ballpen which comprises the steps of forming a recess in a body adapted to receive a ball, providing the recess with a seating surface constituting a spherical sector conforming substantially to the surface of the ball and providing axially extending channels in the body terminating at the seating surface while opening into the ink-supply bore which has previously been provided therein; the ball may then be seated in the recess. The body is provided with a wall portion of the recess extending beyond the seating surface and adapted to be clenched or clamped around the ball forwardly of a diametral plane thereof perpendicular to the axis of the body in order to secure the ball in engagement with the seat. The ball is forced into contact with the seat under pressure but cannot deform the walls of the channels in such manner as to constrict the latter since the spherical seating surface engages the ball over a substantial region of its periphery, and there is little tendency for the material constituting the body to deform so as to block the channels. Moreover, the pressure is applied axially to the ball and the seating surface which is so shaped as to transmit substantially all of the force applied to it in radial direction, there being no component of the applied force effective angularly about the axis of the body which might otherwise cause a deformation of the latter so as to constrict the channels.

The body may be provided with an auxiliary supporting member of hardened or wear-resistant material, as claimed in my copending application, in point contact with the ball along its periphery within the annular seating surface. The auxiliary supporting member may be an insert (e.g. of hardened steel or bearing stone) which is held in place within the recess by the radially extending ribs defining the aforementioned channels. Generally, the body will be formed from a relatively soft material, such as brass, phosphor bronze or stainless steel, in contrast with the hardened member which may be a ruby, sapphire or the like. The wear-resistant member may be provided with a convex surface osculating the ball and, consequently, may be of generally spherical or hemispherical configuration.

According to an essential feature of this invention, the seat, after being cut into the body with a cutting tool by turning, the tool having a cutting edge conforming generally to the curvature of the ball to be seated in the body, is burnished by a polishing tool of spherical configuration and provided with polishing formations. The burnishing operation is carried out without significant removal of material, at least the formations being composed of a material substantially harder than the seat, e.g. tungsten carbide.

In another aspect of the invention, the burnishing tool has a tip of spherical curvature provided with tungsten or silicon carbide grains, the tip conforming precisely to the curvature of the ball to be seated. The burnishing operation has been found to markedly reduce the number of rejects formerly encountered in seating the balls since substantially no axial pressure need be applied thereto. In practice, when sapphire balls are employed, the number of rejects resulting from the use of axial pressure (usually from tens to hundreds per thousand tips) have been reduced to substantially zero. Moreover, the burnishing operation has been found to increase the useful life of ballpoint pens, which have frequently become inoperative hitherto even though provided with a plentiful ink supply, many-fold.

The above and other objects, features and advantages of my present invention will become more readily apparent from the following description, reference being made to the accompanying drawing in which:

FIGS. 1–5 are axial cross-sectional views through a ballpoint-pen tip showing successive steps in its manufacture;

FIG. 6 is a plan view of the body prior to the seating of the ball therein;

FIG. 7 is an axial cross-sectional view of a tip provided with an insert;

FIG. 8 is a cross-sectional view taken along the line VIII—VIII of FIG. 7;

FIG. 9 is a view similar to that of FIG. 7 showing another embodiment of the invention;

FIG. 10 is a plan view of a tool employed in the formation of the ball seat;

FIG. 11 is a plan view of a tool for forming the channels therein;

FIG. 12 is an end view of the latter tool;

FIG. 13 is an elevational view of a burnishing tool in accordance with the invention; and FIG. 14 is an end view thereof.

In FIG. 1 of the drawing I show a ballpoint-pen tip body 10 having a frustoconical forward portion 11 which, according to the invention, is axially drilled to form a recess 12 at its forward end. The mouth 13 of recess 12 is adapted to receive a ball, as will be described in greater detail hereinafter. After the initial drilling of the body 10 to form the recess 12, a further bore 14 is provided. This bore, which extends axially along the body and opens into the sleeve or tube (not shown) forming the ink reservoir, is coaxial with the recess and terminates at the conically sloping floor 15 thereof. This beveled floor (FIG. 2), in earlier ballpoint-pen constructions, served as a seat for the ball which was thrust axially thereagainst in order to shape it to conform its configuration to that of the ball pen; thus, any longitudinal channels terminating at the level surface 15 were constricted owing to the plastic deformation of the material along the walls of such channels upon the compression which seated the ball.

As indicated in FIG. 3, the present invention avoids this disadvantage in that it provides for the shaping of a seat 16 which conforms to a spherical sector whose radius is identical with that of the ball to be lodged in recess 12. The spherical sectoral seat 16 is, advantageously, formed by turning (e.g. with the aid of a boring tool such as that shown in FIG. 10) so that it may be provided either subsequently to the formation of channels, or prior thereto. In FIG. 4 I show the channels 18 which are angularly spaced about the axis of the body 10 and extend longitudinally to form radial ribs 19. A fluting tool such as that shown in FIGS. 11 and 12 may be employed to form the channels, the tool being forced axially by means of a suitable press through the mouth 13 of the body. The use of the fluting tool eliminates the possibility that burrs may be formed along the edges of the ribs to constrict the channels 18 which supply ink to the ball over a substantial portion of its surface although it blocks bore 14. The terminal walls 16' of the channels 18 are, like the seat 16, of spherical sectoral configuration and diverge upwardly to provide a smooth flow of ink to the ball.

Prior to the setting of the ball, which is preferably sapphire, the seat cut into the body is burnished with the tool illustrated in FIGS. 13 and 14. The tool comprises a shank 70 of tool steel and a tip 71 having a spheroidal polishing surface 72 provided with carbide grit. The polishing surface extends over a hemisphere and is provided with silicon- or tungsten-carbide grit.

In FIG. 5 I show the ball 20, which is received in the recess 12, held against the complementarily shaped seat 16. A portion 21 of the body 10, having a relatively small wall thickness, extends forwardly beyond a diametrical plane 22 of the ball transverse to the axis of body 10 and is clenched around the ball to hold it in place. The clenching operation is well known and may be accomplished with the aid of radial pressure, e.g. via forming dies. In general, the axially extending bore 14 may have a diameter of about ½ mm. while the channels have a radial depth of approximately ¼ mm. and a total length equal approximately to the radius of the ball; the diameter of the ball is about 1 mm. From FIG. 6 it may be seen that five channels 18, which are angularly equispaced (e.g. by 72°) about the axis of the body, are provided. The total cross-sectional area of these channels, regardless of the number provided, should be at least equal to that of bore 14.

In FIG. 7 I show a body 30 which is provided with channels 38 terminating at a spherical seat 36 for a ball 31 as previously described. The ribs 39 between the channels 38 are, however, formed with shoulders 35, against which rests a wear-resistant insert 40 substantially in point contact with the ball. The insert thus lies along the axis of the body 30 and is surrounded by the spherical seat 36.

While the wear-resistant insert 40 is shown to be a sphere in FIG. 7, it should be noted that any convex body in point contact with the ball 31 will function in a similar manner. Thus, hemispherical or ellipsoidal members may also be employed. In FIG. 9 I show a block 41 whose planar surface 42 is tangent to the ball 31' and extends transversely to the longitudinal axis of the body 30'. The wear-resistant member 41 is held against axial displacement by the shoulders 35' of ribs 39' which define between them the channel 38'. The wear-resistant inserts or members 40, 41 may be gem stones of ruby, sapphire or like material whose hardness is greater than that of the stainless-steel ball, or of steel or another metal having a hardness at least equal to that of the ball. The body 10, 30, 30' which forms the spherical seating surface 16, 36, 36' may be of relatively soft material such as brass, phosphor bronze or the like. It is also possible for the body to be composed of a material having the same hardness as that of the ball (e.g. of stainless steel).

In FIG. 10 I show a boring tool 50 which carries a cutter bit 51 whose cutting edge 52 is rounded to conform to an arc of the sphere or ball 20, 31, 31' to be received in the seat formed by the tool. The body may then be rotated at relatively high speed while the tool bit 51 is displaced axially into the recess 12 to cut the spherical sectoral side 16 etc. The bit is, of course, provided with the required rakes and clearances.

The fluting tool 60 shown in FIGS. 11 and 12 is provided with ribs 61 which forms the channels 18, 38, 38' when the tool is thrust axially into the recess 12. The end 62 of this tool is rounded generally spherically to form the terminal walls 16' etc. of the respective tip bodies.

I have also discovered that it is possible to control the width of the aforementioned axial channels by suitably varying the bevel 15 (FIG. 2) in the event that the spherical seat 16 is not machined in the pen tip and the ball is forced axially into the latter to form its seat. In this connection, I have found that the material of the tip displaced by the ball flows substantially radially and does not obstruct the channels when the floor of the recess 12 includes an angle substantially less than 45° with the axis of the tip. Thus, the beveled surfaces against which the ball is urged may, in an axial cross-section such as that shown in FIG. 2, include an angle of 70°, the latter having been found to produce optimum results. The channels are then formed by means of a fluting tool substantially as described with reference to FIG. 11. After the channels have been formed, the ball (e.g. ball 20) is forced against the beveled seat 15, which converges at an angle of about 35° toward the axis of the tip, to form the spherical seat 16.

The invention as described and illustrated is believed to admit of many modifications and variations within the ability of persons skilled in the art, all such modifications being deemed included within the spirit and scope of the appended claims.

I claim:
1. A method of making a ballpoint-pen tip from a body having an axis, comprising the steps of:
 (a) forming at a forward axial end of said body a recess open outwardly at said end;
 (b) then forming in said body an axially extending ink-supply bore coaxially aligned with said recess and terminating thereat so as to define an annular lower wall at the junction between said recess and said bore;
 (c) thereafter cutting said lower wall of said recess to form an annular seat surounding said axis and said bore while conforming to a spherical sector of a ball;
 (d) then forming in said body at least one axially extending channel communicating with said bore and terminating at said seat body forcing a fluting tool into said body through said end and said recess;
 (e) burnishing said seat without substantial removal therefrom; and
 (f) inserting into said recess a ball having a periphery conforming to said seat and rotatably fixing said ball in said recess.

2. The method defined in claim 1, further comprising the step of inserting a wear-resistant body into said bore for substantial point contact with said ball upon its insertion into said recess.

3. The method defined in claim 2 wherein said wear-resistant member is composed of a bearing stone and said body is provided with a plurality of inwardly extending generally radial ribs by said fluting tool whereby said ribs form a plurality of angularly spaced channels communicating with said bore and terminating at said seat, further comprising the step of forming said ribs with respective shoulders engaging said member and limiting axial displacement thereof upon insertion of said ball into said recess.

References Cited by the Examiner

UNITED STATES PATENTS

| | | | |
|---|---|---|---|
| 2,536,124 | 1/1951 | Bolvin et al. | 120—42.4 |
| 2,646,761 | 7/1953 | Knobel | 29—441 |
| 2,718,051 | 9/1955 | Cloutier | 29—441 |
| 2,763,970 | 9/1956 | Miller et al. | 51—206 |
| 3,183,632 | 5/1965 | Ferchland | 51—206 |

FOREIGN PATENTS

| | | |
|---|---|---|
| 1,078,547 | 5/1954 | France. |
| 411,016 | 5/1934 | Great Britain. |
| 613,408 | 11/1948 | Great Britain. |

JOHN F. CAMPBELL, *Primary Examiner.*

THOMAS H. EAGER, *Examiner.*